United States Patent
Liu et al.

(10) Patent No.: US 11,528,290 B2
(45) Date of Patent: Dec. 13, 2022

(54) SYSTEMS AND METHODS FOR MACHINE LEARNING-BASED DIGITAL CONTENT CLUSTERING, DIGITAL CONTENT THREAT DETECTION, AND DIGITAL CONTENT THREAT REMEDIATION IN MACHINE LEARNING-BASED DIGITAL THREAT MITIGATION PLATFORM

(71) Applicant: Sift Science, Inc., San Francisco, CA (US)

(72) Inventors: Wei Liu, Seattle, WA (US); Jintae Kim, San Francisco, CA (US); Michael Legore, San Francisco, CA (US); Yong Fu, San Francisco, CA (US); Cat Perry, San Francisco, CA (US); Rachel Mitrano, San Francisco, CA (US); James Volz, San Francisco, CA (US); Liz Kao, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 17/714,986

(22) Filed: Apr. 6, 2022

(65) Prior Publication Data
US 2022/0232029 A1    Jul. 21, 2022

Related U.S. Application Data

(63) Continuation of application No. 17/180,592, filed on Feb. 19, 2021, now Pat. No. 11,330,009.

(Continued)

(51) Int. Cl.
| | |
|---|---|
| *H04L 9/40* | (2022.01) |
| *G06N 20/00* | (2019.01) |
| *G06N 5/04* | (2006.01) |
| *G06F 16/21* | (2019.01) |
| *G06F 16/28* | (2019.01) |
| *G06F 16/2455* | (2019.01) |

(52) U.S. Cl.
CPC ........ *H04L 63/1425* (2013.01); *G06F 16/217* (2019.01); *G06F 16/2455* (2019.01);
(Continued)

(58) Field of Classification Search
CPC ............. H04L 63/1425; H04L 63/1416; G06F 16/217; G06F 16/285; G06F 16/2455; G06N 20/00; G06N 5/04
(Continued)

(56) References Cited

U.S. PATENT DOCUMENTS

| | | | |
|---|---|---|---|
| 8,418,249 B1 * | 4/2013 | Nucci ................... | G06F 21/552 709/225 |
| 8,666,984 B2 * | 3/2014 | Kim ........................ | G06F 40/30 707/737 |

(Continued)

*Primary Examiner* — Hosain T Alam
*Assistant Examiner* — Nicholas E Allen
(74) *Attorney, Agent, or Firm* — Padowithz Alce; Chandler Scheitlin; Alce PLLC

(57) ABSTRACT

A machine learning-based system and method for content clustering and content threat assessment includes generating embedding values for each piece of content of corpora of content data; implementing unsupervised machine learning models that: receive model input comprising the embeddings values of each piece of content of the corpora of content data; and predict distinct clusters of content data based on the embeddings values of the corpora of content data; assessing the distinct clusters of content data; associating metadata with each piece of content defining a member in each of the distinct clusters of content data based on the assessment, wherein the associating the metadata includes attributing to each piece of content within the clusters of content data a classification label of one of digital abuse/digital fraud and not digital abuse/digital fraud; and identifying members or content clusters having digital fraud/digital abuse based on querying the distinct clusters of content data.

18 Claims, 6 Drawing Sheets

Related U.S. Application Data

(60) Provisional application No. 63/121,898, filed on Dec. 5, 2020, provisional application No. 62/985,183, filed on Mar. 4, 2020.

(52) U.S. Cl.
CPC ............ G06F 16/285 (2019.01); G06N 5/04 (2013.01); G06N 20/00 (2019.01); H04L 63/1416 (2013.01)

(58) Field of Classification Search
USPC .......................................................... 726/23
See application file for complete search history.

(56) References Cited

U.S. PATENT DOCUMENTS

| | | | |
|---|---|---|---|
| 2012/0239650 A1* | 9/2012 | Kim ........................ | G06F 40/30 707/E17.089 |
| 2012/0254333 A1* | 10/2012 | Chandramouli ........ | G06F 40/10 709/206 |
| 2017/0171580 A1* | 6/2017 | Hirsch ..................... | H04L 67/62 |
| 2018/0375896 A1* | 12/2018 | Wang ................... | G06F 16/9535 |
| 2019/0199745 A1* | 6/2019 | Jakobsson ........... | H04L 63/1483 |
| 2019/0236598 A1* | 8/2019 | Padmanabhan .... | G06Q 20/0655 |
| 2019/0258958 A1* | 8/2019 | Adjaoute .............. | G06F 16/215 |
| 2019/0349351 A1* | 11/2019 | Verma ................... | G06F 21/552 |
| 2019/0379705 A1* | 12/2019 | Murphy ................ | G06F 21/561 |
| 2020/0065816 A1* | 2/2020 | Walters ................. | G06N 3/084 |

\* cited by examiner

Sourcing Content Data S205

Computing Embedding Values of Content Data S210

Clustering Content Data S220

Processing Clusters of Content Data S230

Bulk Classification of Cluster Content Data S232

Generate Cluster Mappings & Network Maps S234

Applying Content Similarity Requirements S235

Constructing Searchable Cluster Index S240

Implementing Content Console S250

Implementing Content Threat Mitigation S260

FIGURE 2

SYSTEMS AND METHODS FOR MACHINE LEARNING-BASED DIGITAL CONTENT CLUSTERING, DIGITAL CONTENT THREAT DETECTION, AND DIGITAL CONTENT THREAT REMEDIATION IN MACHINE LEARNING-BASED DIGITAL THREAT MITIGATION PLATFORM

CROSS-REFERENCE TO RELATED APPLICATIONS

This application is a continuation of U.S. patent application Ser. No. 17/180,592, filed 19 Feb. 2021, which claims the benefit of U.S. Provisional Application No. 62/985,183, filed 4 Mar. 2020, and U.S. Provisional Application No. 63/121,898, filed 5 Dec. 2020, which are incorporated herein in their entireties by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enables entities to engage and perform an incalculable number of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In one embodiment, a machine learning-based method for content clustering and content threat assessment in a machine learning task-oriented threat mitigation platform includes generating embedding values for each piece of content of one or more corpora of content data; implementing one or more unsupervised machine learning models that: (i) receive model input comprising the embeddings values of each piece of content of the one or more corpora of content data; and (ii) predict a plurality of distinct clusters of content data based on the embeddings values of the one or more corpora of content data; assessing the plurality of distinct clusters of content data; associating metadata with each piece of content defining a member in each of the plurality distinct clusters of content data based on the assessment, wherein the associating the metadata includes attributing to each piece of content within the plurality of clusters of content data a classification label of one of (a) digital abuse or digital fraud and (b) not digital abuse or not digital fraud; and identifying one or more members or one or more content clusters having digital fraud or digital abuse based on querying the plurality of distinct clusters of content data.

In one embodiment, the method includes providing a querying interface comprising a content application programming interface (API) that is searchably connected to the plurality of distinct clusters of content data; querying, via the querying interface, the plurality of distinct clusters of content data based on a cluster query; and returning one or more of the plurality of distinct clusters of content data based on the querying.

In one embodiment, the cluster query comprises text content observed from an online post or an electronic communication, the text content is converted to a text embedding value, and the returning includes identifying the one or more of the plurality of distinct clusters of content data that include members having the text embedding value.

In one embodiment, the method includes providing a querying interface that includes a tuning interface object that, when adjusted or acted upon by user input, tunes one or more clustering similarity thresholds to increase or decrease a number of members within a target cluster of the plurality of distinct clusters of content data.

In one embodiment, the method includes querying, via the querying interface, the plurality of distinct clusters of content data based on a cluster query; returning one or more of the plurality of distinct clusters of content data based on the querying; and increasing or decreasing a number of members within the one or more of the plurality of distinct clusters of content data based on an input to the tuning interface object.

In one embodiment, the method includes creating a cluster mapping that associates a search grain with at least one cluster of the plurality of distinct clusters of content data.

In one embodiment, the search grain comprises a subject piece of content data, and the method further includes using the subject piece of content data to query the plurality of distinct clusters of content data; and returning, based on the subject piece of content data, one or more clusters of the plurality of distinct clusters of identifiers of the plurality of distinct clusters of content data.

In one embodiment, the method includes deriving, based on the plurality of distinct clusters of content data, a plurality of distinct clusters of identifiers of a plurality of online users that post online content.

In one embodiment, the method includes creating a cluster mapping that associates a search grain with at least one cluster of the plurality of distinct clusters of identifiers of the plurality of online users that post online content, wherein the search grain comprises an online user identifier of a user attempting to post online content or posting online content; using the online user identifier to query the plurality of distinct clusters of identifiers of online users; and returning, based on the online user identifier, one or more clusters of the plurality of distinct clusters of identifiers of the plurality of online users.

In one embodiment, the search grain comprises an identifier of a subscriber to an online threat service implementing the machine learning-based method, the method further includes using the identifier of the subscriber to query the plurality of distinct clusters of identifiers of the plurality of online users; and returning, based on the identifier of the subscriber, one or more cluster members from one or more of the plurality of distinct clusters of identifiers of the plurality of online users.

In one embodiment, the content data relates to text data, communication data, or media data that is posted to a web or Internet-accessible medium, platform, service, system, or channel.

In one embodiment, associating the metadata includes: associating the classification label, in bulk, to a target cluster of the plurality of distinct clusters of content data, wherein the associating the classification label in bulk causes an association of a single classification label to all members of the target cluster.

In one embodiment, the method includes the identifying includes identifying the one or more members or the one or more content clusters based on a query comprising a metadata tag, the metadata tag identifying a classification of the one or more members or the one or more content clusters; and creating corpus of labeled training data samples for training a target machine learning model based on the one or more members or the one or more content clusters having the associated metadata tag.

In one embodiment generating the embeddings values includes: implementing a sentence embeddings or a text embeddings service; using the sentence embedding or the text embeddings service to generate vector representations for at least a text portion of each piece of content of the one or more corpora of content data.

In one embodiment, the method includes creating an automated decisioning workflow based on the identifying the one or more members or the one or more content clusters having digital fraud or digital, wherein the automated decisioning workflow computes, based on machine learning-based scoring of content data, one of a plurality of distinct automated disposal decisions that includes automatically allowing, holding, or disallowing content.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
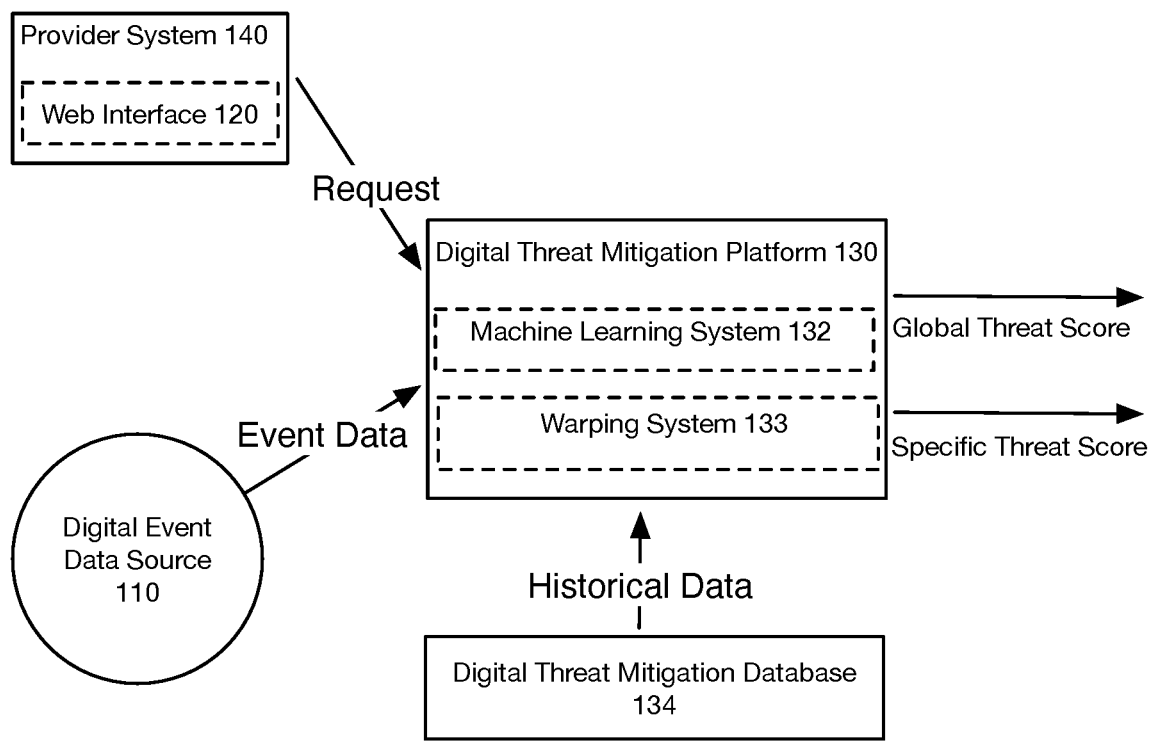
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities, as described in U.S. Pat. No. 9,954,879, which is incorporated herein in its entirety by this reference.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith. Additionally, or alternatively, in one or more embodiments, digital event data processing decisions may be automated via automated decisioning workflows, as described in U.S. Pat. No. 9,954,879, which is incorporated herein in its entirety by this reference and digital event data processing decisions may be performed with manual input from one or more human analysts or the like. In such embodiments, decisions output from one or more review queues of the one or more human analysts may be converted to training data for training and improving one or more threat classifying models of the threat mitigation service including, but not limited to, an unified threat model.

Additionally, recognizing that traditional spam detection models often only consider a body of text of specific content for suspicious language signals, this strategy of spam detection may make it difficult to identify a risky user before the risky user creates a piece of harmful content. One or more embodiments of the present application, however, may function to construct and implement a content clustering method and system that may be capable of identifying content threat signals and providing an interface for performing content and/or user threat assessments and decisioning.

1. System for Digital Fraud and/or Abuse Detection and Scoring

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables subscribers to and/or customers of a threat mitigation service implementing the system 100 to generate a request for a global digital threat score and additionally, make a request for specific digital threat scores for varying digital abuse types. After or contemporaneously with receiving a request from the web interface 120, the system 100 may function to collect digital event data from the one or more digital event data sources 110. The system 100 using the digital threat mitigation platform 130 functions to generate a global digital threat score and one or more specific digital threat scores for one or more digital abuse types that may exist in the collected digital event data.

The one or more digital event data sources no function as sources of digital events data and digital activities data, occurring fully or in part over the Internet, the web, mobile applications, and the like. The one or more digital event data sources no may include a plurality of web servers and/or one or more data repositories associated with a plurality of service providers. Accordingly, the one or more digital event data sources no may also include the service provider system 140.

The one or more digital event data sources no function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implements at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources no and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., nave Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enables users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communicate with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. Additionally, or alternatively, the web (client) interface 120 may be used to collect manual decisions with respect to a digital event processing decision, such as hold, deny, accept, additional review, and/or the like. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

Additionally, as shown in FIG. 2-FIG. 6, the systems and methods described herein may implement the digital threat mitigation platform in accordance with the one or more embodiments described in the present application as well as in the one or more embodiments described in U.S. patent application Ser. No. 15/653,373, which is incorporated by reference in its entirety.

2. Method for Machine Learning-Based Content Clustering, Content Threat Detection/Assessment, and Content Threat Remediation As shown in FIG. 2, the method 200 for machine learning-based content clustering and content threat assessment including sourcing content data S205, generating embedding values for content data S210, clustering content data S220, processing clusters of content data S230, and constructing a searchable cluster index S240. The method 200 may optionally include applying content similarity thresholds S235, implementing a content console S250, and implementing one or more content threat mitigation and/or remediation techniques S260.

2.05 Content Collection

S205, which includes sourcing content data, may function to periodically or continuously collect content data. In one or more embodiments, S205 may function to collect content data in an offline setting, such that the content data includes historical content data that may have been collected and stored during a historical period. In some embodiments, S205 may function to collect content data in an online or real-time setting, such that the content data includes current or real-time content data being actively collected by a threat system/threat service implementing the method 200 or the like. In such embodiments, the real-time content data may be collected or accessed via streams of content data provided via a content or event-specific application programming interface to a threat service or threat system implementing the method 200.

Content Data Sourcing

In one or more embodiments, S205 may function to source content data by aggregating or collecting content data via a content or events application programming interface (API). In such embodiments, the content API may preferably be associated with a machine learning-based threat service implemented by the system 100 and that may function to implement the method 200. Preferably, the content API may function to receive content signal data or streams of content data from a plurality of distinct sources including from a plurality of distinct subscribers to the machine learning-based threat service. In one or more embodiments, the content data may be provided via the content API together with or accompanied by one or more requests for identifying digital abuses or digital fraud based on an evaluation of the content data with one or more machine learning-based systems or modules of the threat service.

In one or more embodiments, content data preferably relates to and/or may include substances, text data or media data (e.g., image data, graphics, renderings, recordings, etc.) that may be posted to a web or Internet-accessible medium, platform, service, system, or channel. As a non-limiting example, content data may include substance of online listings, profiles, posts, comments, messages (e.g., online chats), reviews and the like made by one or more online users. In a preferred embodiment, content data comprises text data and/or various content data that may be converted into a text or textual representation. For instance, in some embodiments, content data may include a video recording with an audio message. In such an instance, the audio message component of the video recording may be converted into text for purposes of processing the content data through one or more downstream techniques, processes, and/or components, such as to a sentence and/or sentence embeddings service or component.

2.10 Embeddings Generation

S210, which includes computing embedding values based on content data, may function to convert the content data to or generate vector representations or text representations for at least a text component of the content data. In a preferred embodiment, S210 may function to implement a sentence or text embeddings service or module of a threat service implementing the systems and/or methods described herein. S210, using the sentence embeddings service, may function to generate text representations based on an input of the content data. That is, S210 may function to generate a plurality of text representations in which words or a string of text having a similar meaning may have a similar representation.

Accordingly, S210 may function to collect the corpus of content data, extract a plurality of distinct strings of text from the corpus of content data, and compute text representations based on the strings of text. Preferably, each distinct string of text (e.g., each distinct sentence or the like) extracted from the content data may be fed as input into a sentence embeddings model that may function to map each distinct string of text to vectors of real numbers or the like in n-dimensional space.

Figure 3:
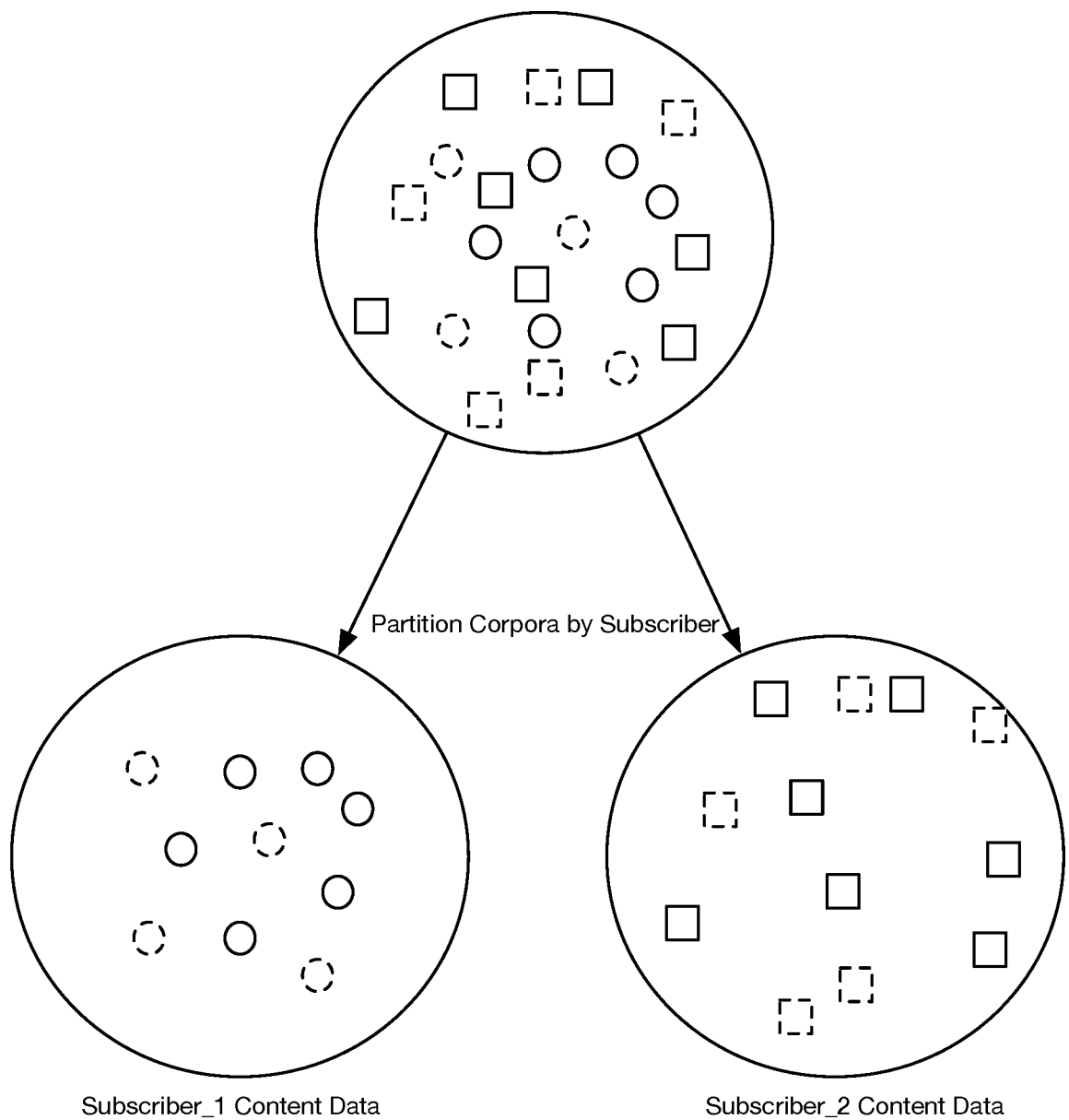
FIG. 3 illustrates an example schematic of content data partitioning in accordance with one or more embodiments of the present application.
Figure 4:
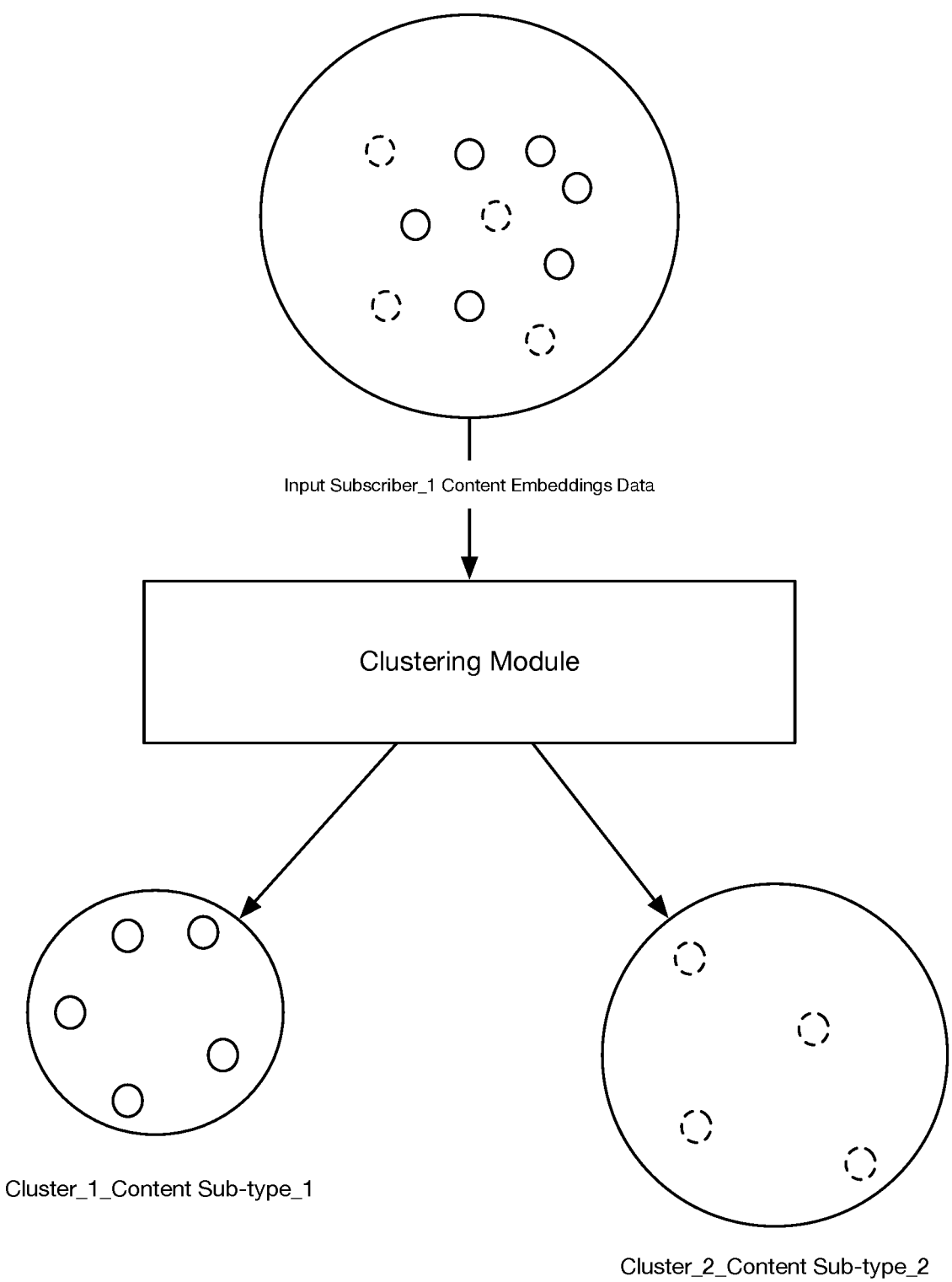
FIG. 4 illustrates an example schematic of content data clustering in accordance with one or more embodiments of the present application.
Figure 5:
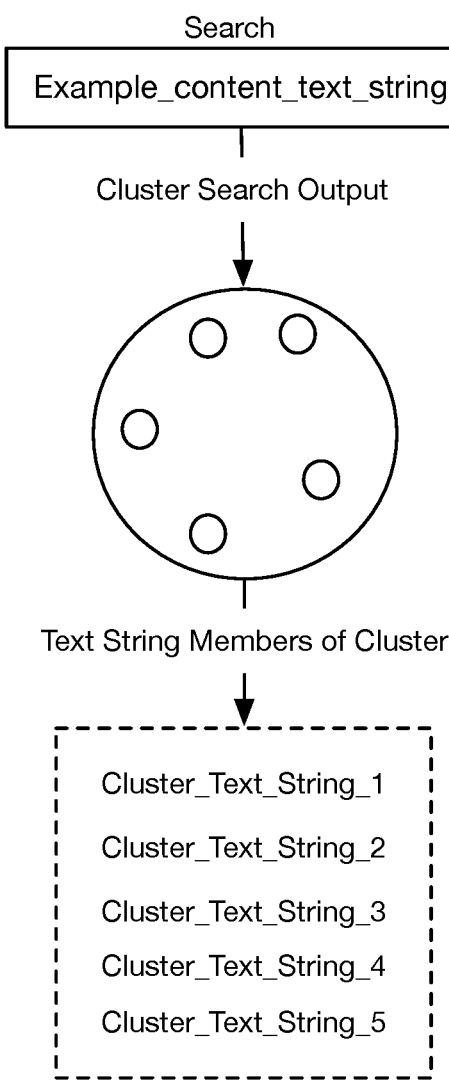
FIG. 5 illustrates an example schematic of a content cluster data search in accordance with one or more embodiments of the present application.
Figure 6:
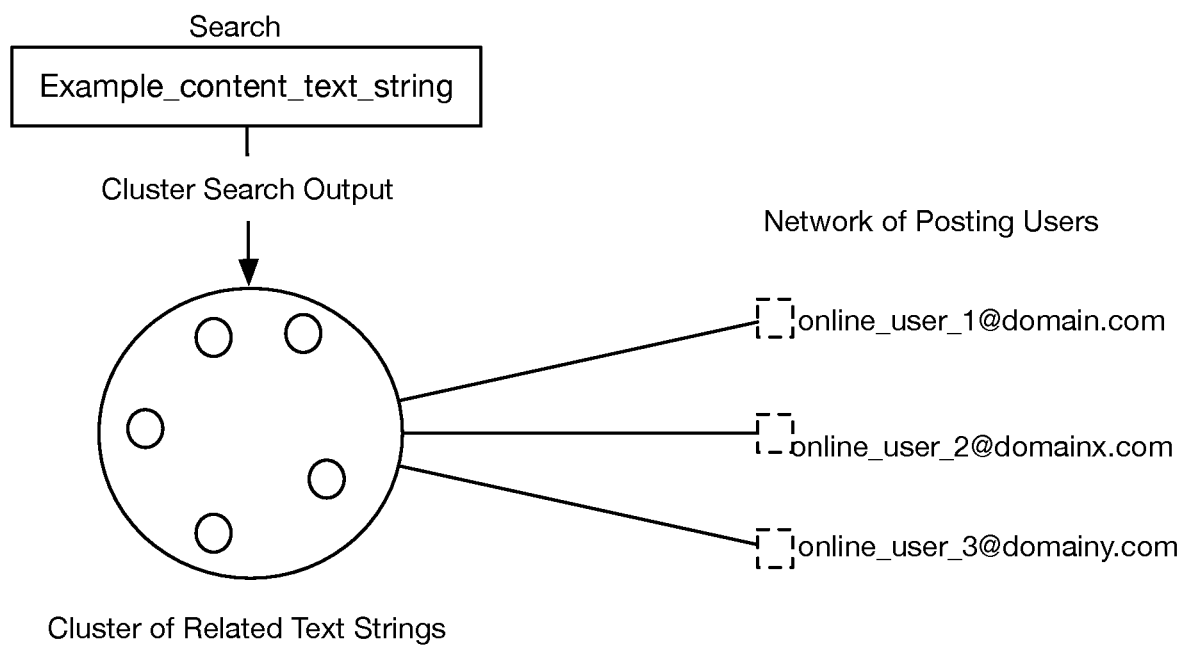
FIG. 6 illustrates an example schematic of a content cluster data search and expansion to user networks in accordance with one or more embodiments of the present application.

In one or more embodiments, S210 may function to additionally, or alternatively divide or organize the corpus of content data into a plurality of distinct groupings, as shown by way of example in FIG. 3. In such embodiments, S210 may function to organize subsets of the content data by subscriber (i.e., customer) to the threat service and thereby, generating subscriber-specific distinct corpora of content data. Preferably, S210 may function to organize or divide the corpus of content data into smaller subsets of content that may be organized on the basis of both a subscriber and sub-type of digital content fraud or digital content abuse. That is, S210 may function to create or form the corpus of content data a plurality of distinct subscriber and fraud/abuse sub-type-specific corpora. For instance, for a given first subscriber, S210 may split the corpus of content data into a collection of first-subscriber-only content data. S210 may function to further subdivide the collection of first-subscriber-only content data into two or more distinct collections or corpora of sub-types of content, such as a first sub-type comprising online listings content and a second sub-type comprising reviews content for the first subscriber.

In a first, preferred implementation, S210 may function to implement or use a bidirectional encoder representation form transformers (BERT) model as a target sentence embeddings service or model for generating sentence embeddings for each of the plurality of distinct pieces of content of the corpus of content data. It shall be recognized that BERT comprises a transformer-based deep learning technique (or transformer-based neural network architecture) for natural language processing. In this first implementation, S210 may function to generate sentence embeddings based on using BERT-as-a-service. For example, a sentence embedding (model) or (natural) language machine learning (model), may function to receive an input of one or more strings of texts or one or more distinct sentences and generate or output one or more vector representations of the texts or sentences.

In a second implementation, S210 may function to implement a sentence embedding technique including a universal sentence encoder (USE), such as a Deep Averaging Network method, which functions to average sentence embeddings of a target input of textual data and passes the resultant averages through a feedforward network or the like to generate a vector representation for each target segment of text data. Preferably, the USE may be trained using a range of supervised and unsupervised tasks.

In a third implementation, S210 may function to implement a sentence embedding technique including a smooth inverse frequency (SIF). Using the SIF technique, S205 may function to compute a weighted average of sentence embeddings for each target segment of text data. In this second implementation, the weighted average for each target segment of user input may be determined based on a word frequency.

In a fourth implementation, S210 may function to implement as a sentence embedding technique a simple average of sentence embeddings. That is, S205 may function to compute an unweighted average of sentence embeddings that preferably may not allow for preferential weightings based on one or more characteristics of a target segment of text data.

Additionally, or alternatively, S210 may function to select one or more of a plurality of distinct sentence embeddings techniques based on attributes or characteristics of a given corpus of content data. For instance, S210 may function to select a first embeddings technique of a plurality of distinct embeddings techniques based on an average length of the distinct strings (i.e., average number of tokens in a string) of text within a corpus of content data. Thus, S210 may function to select from one of any available sentence embeddings techniques, such as the sentence embeddings techniques described in the above implementations, based on one or more characteristics of the content data. In some embodiments, S210 may function to select a combination of two or more distinct sentence embeddings techniques for generating sentence embeddings for a target corpus of content data.

It shall be recognized that any suitable or combination of sentence embeddings techniques and/or services may be implemented in S210 for computing sentence embeddings for a target corpus of content data.

2.20 Content Data Clustering

S220, which includes identifying one or more groupings of related content data, may function to assess one or more distinct corpora of content data and surface one or more distinct groupings or clusters of related pieces of content. That is, in one or more embodiments, S220 may function to group text content based on semantic similarity or the like.

Additionally, or alternatively, S220 may function to partition the group of text embeddings for the content data into distinct subsets of embeddings for the content data, in a similar fashion as described in S205. In this way, S220 may function to perform the assessment subscriber-specific and/or content type-specific content data.

In a preferred embodiment, S220 may function to cluster the content data into one or more groupings of content data based on implementing one or more deep learning models. In such embodiments, S220 may function to identify or collect content data in which the text strings or text data have been previously converted, via sentence embeddings, to text representations. S220 may function to pass each corpus or each sub-corpus of content data, in the form of sentence embeddings or sentence vectors, as input into an unsupervised machine learning model that may function to compute one or more clusters or groupings of content data, as shown by way of example in FIG. 4. In such preferred embodiment, the deep learning model comprises a deep learning model (e.g., Bert model). Thus, the distinct pieces of content within a given corpus of content data may be unlabeled.

Accordingly, S220 may function to compute fraud/abuse type-specific and/or content type-specific groupings or clusters using the one or more deep learning models. In some embodiments, S220 may function to compute or attribute fraud/abuse type-specific and/or content type-specific classification labels to each grouping or cluster of content data.

Additionally, or alternatively, S220 may function to compute clusters for a specific type of content fraud or content abuse across multiple distinct subscribers. That is, S220 may aggregate content data for a specific type of content fraud/abuse sourced from multiple distinct subscribers and compute clusters or pattern groupings based on using the one or more deep learning models.

It shall be recognized that any suitable unsupervised or semi-supervised machine learning mode may be employed including, but not limited to, balanced iterative reducing and clustering using hierarchies (BIRCH), DBSCAN, k-means, mini-batch k-means, mean shift, ordering points to identify the clustering structure (OPTICS), spectral clustering, and/or the like. Similarly, the method 200 may employ other machine learning models including, but not limited to, a gaussian mixture model, long-short-term memory networks (LSTMS), recurrent neural networks, generative adversarial networks, classic neural networks, self-organizing maps, deep belief networks, restricted Boltzmann machines, auto-encoders, and/or the like. In one or more embodiments, S220 may function to select one or more deep learning models for computing and/or identifying one or more related groupings of content data based on attributes or characteristics of the corpus of content data.

Additionally, or alternatively, in one or more embodiments, S220 may function to selectively set a similarity threshold for a given clustering or grouping technique. That is, S220 may function to implement an interface at which a tunable similarity threshold or a tunable grouping threshold may be set or applied pre hoc or post hoc a clustering of the content data that may function to adjust a number of pieces of content data in a respective cluster or grouping. In one or more embodiments, S220 may function to provide a toggle or other tuning user interface object that may be manipulated to set and/or re-set similarity requirements or thresholds when implementing a clustering or a grouping using one or more deep learning models or for identifying a cluster or a grouping based on a content query or the like. In some embodiments, similarity requirements and/or similarity thresholds may be set by simply providing an input value via an API or other user interface.

In a first implementation, S220 may function to set a similarity requirement or threshold for a given clustering task using a clustering machine learning model (e.g., DBSCAN) to be a value that may be below one hundred percent (100%), a near exact similarity setting, or similar value or setting that allows a cluster to be formed or identified with non-identical but semantically similar distinct pieces of content data (i.e., near identical) or a cluster that includes character substitutions within strings of text data. In this first implementation, S220 may function to enable a setting or may function to set similarity requirements pre hoc of the clustering of the content. That is, in such embodiments, the similarity requirements may be used to adjust one or more hyperparameters that govern similarity or the like of a machine learning model performing the clustering or grouping. Accordingly, the threshold parameter may be a parameter to a given clustering algorithm (e.g., DBSCAN) that may function to determine a threshold on the similarity metrics computed from the sentence embeddings for content data (e.g., the embeddings may be output of deep learning models). Thus, in this first implementation, the one or more deep learning models for generating the embeddings may be orthogonal from the cluster algorithm for generating or identifying clusters based on the sentence embeddings for the content data.

In a second implementation, S220 may function to set a similarity requirement or threshold to 100%, exact setting, or similar value that configures the deep learning model to return clusters or groupings of content data having identical pieces of content (i.e., exact duplicates).

Accordingly, S220 may function to adjust or tune similarity requirements or thresholds for a given clustering task that may potentially enlarge or diminish clustering groups of content data. In one or more embodiments, S220 may function to set or select a similarity requirement or threshold based on an objective of a fraud or discovery session.

2.30 Cluster Processing and Cluster Metadata Generation

S230, which includes processing one or more groupings or clusters of content data, may function to collect the one or more identified, distinct clusters of content data and apply one or distinct intelligent processing techniques to the distinct clusters.

In one or more embodiments, S230 optionally includes S235, which may function to apply content similarity criteria only after a clustering of content data is performed. That is, in some embodiments, rather than setting similarity requirements or criteria at a clustering stage for the content data, S235 may function to collect raw content clustering data and selectively apply similarity criteria or thresholds post-clustering.

2.32 Cluster Bulk Decisioning/Labeling

Additionally, or alternatively, S230 includes S232, which may function to classify each grouping or cluster of content data in bulk. In one or more embodiments, the method 200 includes making available one or more predefined classification labels which may apply to one or more distinct clusters of content data. For instance, a set of predefined classification labels that may be applied to clusters of content data include one or more of fraud, not fraud, accept, block, review, emerging fraud, outlier, etc. Based on characteristics of a cluster or a grouping of content data, S230 may function to apply one or more predefined classification labels that best suits or matches a broad categorization of each identified cluster of content data.

In one or more embodiments, S230 may function to assign or apply in bulk a classification label to a given cluster of content data that, in turn, applies the classification label to each piece of distinct content within the given cluster. Accordingly, S230 may function to identify potentially good and bad content en masse, which in some embodiments, may allow for substantial efficiencies in processing large volumes digital content data for fraud or abuse.

In one or more embodiments, S230 may function to assign or apply, in bulk, a given classification label to a plurality of distinct user associated with a given cluster of content data. In such embodiments, S230 may function to trace each piece of content within an identified cluster of content data to a plurality of distinct online users that may have posted online the pieces of content within the identified cluster. In this way, S230 may function to apply a given classification label to the group of online users in bulk.

Additionally, or alternatively, S232 may function to perform emerging digital content fraud/abuse or label discovery for clusters of content data in which there may not be a historical or an existing classification label definition or a historical or an existing like cluster or grouping of content data. Thus, in such embodiments, in which the identified cluster of content data contains a new type or an unseen type of digital fraud or digital abuse, S232 may function to assign an emerging classification label to the identified cluster of content data. An emerging classification label, in such embodiments, may function to cause or trigger additional discovery with respect to the type or kind of content within the identified cluster and eventual creation of a distinct fraud (e.g., new spam, new scam, etc.) or not fraud classification label.

2.34 Mappings|Networks

Additionally, or alternatively, S230 includes S234, which may function to generate cluster mappings and/or connected user networks based on one or more identified clusters of content data.

In one or more embodiments, for each distinct piece of online content that exists in a corpus of content data, S234 may function to map each distinct piece of online content to a corresponding cluster of content data that has been assigned a given classification label. For instance, for each distinct string of text data that may be evaluated for digital fraud or digital abuse, S234 may function to map, assign or digitally link each distinct string of text data to an existing or labeled cluster of content data indicating that the distinct string of text belongs to, is related, or is otherwise associated with the other content members of the cluster and thus, may also share the same classification label of the assigned cluster of content data.

Additionally, or alternatively, S234 may function to construct and/or generate connected user networks or user network mappings for identified clusters of content data. Preferably, S234 generates the user network mappings for identified clusters of content data having a bad or adverse (i.e., digital fraud, digital abuse label, etc.) classification label assigned to the cluster or to a majority of the members of the cluster. In one embodiment, S234 may function to identify each of a plurality of distinct users posting content of a given cluster of content data and populate or automatically create a graphical network, which may include nodes (i.e., users) and edges (i.e., strength of connect, shared volume of posts, etc.), that identifies and includes networks of users that produce similar clusters of content. In this way, a display of a connected network of users posting semantically similar or exact (fraud or abusive) content may be visually perceptible and evaluated for bulk decisioning and/or further digital threat remediation. In a similar manner, S234 may function to generate network mappings in which a single user may be mapped or networked to a plurality of distinct or different clusters of content data that the user may be or may have posted in an online environment or the like.

2.36 Cluster Metadata Generation

Additionally, or alternatively, S230 includes S236, which may function to create a plurality of distinct pieces of metadata for and assign to each identified cluster of content data. In one or more embodiments, cluster metadata may include, but is not limited to, a number of members (i.e., pieces of content) of content within an identified cluster, a number of adverse or bad classification labels in the identified cluster, a number of good or non-adverse classification labels in the identified cluster, a representative example of text or representative member of the identified cluster, a cluster identifier, a subscriber identifier (i.e., a subscriber associated with or that sourced the content data), and/or the like.

It shall be recognized that S230 may function to generate any suitable metadata relating to characteristics or attributes any identified cluster of content data including, but not limited to, metadata that describe a size or a shape of an identified cluster, a general or relative location of a cluster in n-dimensional space, a value and/or position of a centroid of an identified cluster, and/or any characteristic or attribute of an identified cluster. In one example, a centroid for each identified cluster may be computed or calculated contemporaneous with or during a computation of a given cluster of content data.

2.40 Cluster Index Construction Using Cluster Metadata

S240, which includes constructing a cluster data index, may function to create a searchable and/or reference data structure for identified clusters of content data. That is, in a preferred embodiment, S240 may function to build a reference table or referenceable data structure or the like that includes cluster content data together with a plurality of distinct referencing identifiers (i.e., metadata tags) that may be mapped to each of a plurality of distinct clusters of content data. In some embodiments, the referencing identifiers may include key terms, search terms, or any other suitable token for identifying and/or surfacing distinct pieces or bodies of cluster content data.

In a preferred embodiment, S240 may function to create a cluster data index or a cluster mapping based on mapping a plurality of possible embeddings values to each identified cluster or grouping of content data. That is, in one or more embodiments, S240 may function to map a subset of text vector or text embeddings values of a text vector space to each cluster or grouping of content data. In this way, each cluster or grouping of content data may be exposed or returned based on a query containing a subject embeddings value/text vector value or the like. For instance, in some embodiments, a search or query may be performed by providing a subject text or string of text, the method 200 may convert that subject text to an embeddings value or text vector value and perform a search of the cluster index data or mappings using the embeddings values or text vector value. In such example, the embeddings value may be included in one or more clusters or groupings of content data and a system implementing the method 200 may function to return the identified one or more clusters or groupings of content data.

In one or more examples, S240 may function to construct a cluster data index that includes one or more of a subscriber identifier, a cluster identifier, a user (of a subscriber) identifier, and/or the like. In such examples, a cluster lookup or search may be performed by providing a search request or search query (e.g., via csv, SQL, or the like) that includes at least one of the searchable criteria or parameters (e.g., subscriber identifier, etc.), as shown by way of example in FIG. 5.

In one or more embodiments, S240 may function to create a plurality of distinct cluster indices. In such embodiment, each of the plurality of distinct cluster indices may relate to a distinct sub-type of content (e.g., listings, reviews, profiles, posts) and/or to a distinct sub-type of digital fraud or digital abuse (e.g., spam, scam, etc.). Each of the distinct cluster indices may include unique metadata tags and/or index identifiers that enable a unique search for cluster data from that specific index and the like. For instance, for each distinct index, a searchable feature or parameter of the index may include the distinguishing feature of the index, such as the content sub-type or the fraud/abuse sub-type that is represented in an underlying cluster of content data of the specific index.

2.50 Implementing Content Threat Console

Additionally, or optionally, S250, which includes implementing or providing one or more of a web-based content console and/or clusters API, may function to make accessible or available cluster content data via one web-based interfaces for one or more purposes including, but not limited to, content fraud or abuse investigation or content threat assessments, new fraud or abuse content discovery, content fraud or content abuse remediation/decisioning, content fraud or content abuse research, and/or the like.

In a first implementation, S250 may function to implement a web-based console comprising one or more search input boxes or search input bars. In this first implementation, the web-based console may enable a user to perform a cluster content data search based on providing search input or a search query. In response to receiving a search query or the like, a threat service or threat system providing the web-based console may function to lookup one or more pieces of cluster content data based on the search query and return to an interface of the web-based console results of the search.

In one or more embodiments, results of a search via the web-based console may include cluster content data comprising a plurality of strings of text. That is, in the circumstance that a search input comprises a string of content text, S250 may function to return a plurality of strings of text from a cluster that matches exactly, semantically matches, and/or nearly matches the search string of content text.

Additionally, or alternatively, S250 may function to enable a variation of a similarity threshold for a given cluster of content data. In such embodiments, a subscriber or other console user may function to manipulate or change a similarity threshold for a given cluster of content data which may function to increase or decrease a similarity sensitivity for cluster results returned based on a search input. For instance, in one embodiment, increasing the similarity threshold may function to reduce a returned cluster size by increasing a similarity requirement between the search input (e.g., content text string) and members of a relevant cluster of content data. Conversely, decreasing the similarity requirement between a content string text or the like of a search query and members of a relevant cluster of content data may function to increase the number of members of a given cluster of content data that may be returned as results for the search query.

In one or more embodiments, results of a search via the web-based console may include one or more users or a network mapping of users relating to a subject matter of the search. In such embodiments, S250 may function to return a user based on a search query and also, enable an expansion to a network relating to the user, as shown by way of example in FIG. 6. That is, in some embodiments, S250 may function to expand and display a network of other users that post online content similar to a given user that may have been identified based on a search.

In a second implementation, S250 may function to implement a content API that supports specific or unique API calls for returning or surfacing cluster content data and/or the like. In this second implementation, S250 may function to enable text cluster lookups and user lookups using various programming instructions, such as API calls or requests, that causes the content API service to perform the various lookups or requested actions. In one or more embodiments, S250 may function to implement the content API to perform similar functions as the web-based console.

In some embodiments, S250 may function to implement both or a combination of the web-based console and the content API for cluster content data discovery and/or content threat assessment and threat remediation.

2.6 Content Threat|User Threat Mitigation

Additionally, or optionally, S260, which includes implementing one or more content threat mitigation and/or content threat remediations, may function to generate, construct, or respond to content-based threats (e.g., fraud or abuses) or new risk signals based on identifying malicious content or malicious users associated with one or more a cluster of content data and a cluster of content posting users.

In one or more embodiments, S260 may function to implement bulk decisioning on a cluster of content data and/or a cluster of users associated with one or more clusters of content data. In such embodiments, S260 may enable an efficient mitigation of content threat from a large cluster of users and harmful content based on a bulk block decision or the like that blocks the content from being posted online or removing the content post from online platforms. Similarly, the bulk block decision may function to block a plurality of users identified with harmful content from posting current or future content.

Additionally, or alternatively, S260 may function to enable or implement a creation of one or more automated decisioning workflows or one or more specific decisioning routes of an automated decisioning work that may function to automatically evaluate a potential harmful piece of content and generate a proposed or recommend decision or disposal (e.g., block, accept, review, hold, verify (multi-factor auth), etc.) for each subject content evaluated through the one or more automated decisioning workflows, as described in U.S. Pat. Nos. 9,954,879 and 10,897,479, which are incorporated herein in their entireties by this reference. Accordingly, in such embodiments, S260 may function to establish or set decisioning routes and decisioning thresholds for triggering or selecting a decisioning route for a given piece of content. Additionally, or alternatively, S260 may enable the setting of one or more rules for automatically handling each piece of content that may be evaluated via the one or more automated decisioning workflows.

Additionally, or alternatively, S260 may function to enable a creation of new rules or a variation of existing thresholds and/or rules of an existing workflow. For example, for an automated decisioning workflow that may function to evaluate a threat or risk of a user posting harmful content, S260 may function to set additional rules and thresholds that causes the automated decisioning workflow to additionally evaluate, via a cluster lookup and content/user assessment (e.g., S250), the potentially harmful content associated with the target user.

It shall be recognized that S260 may function to implement any suitable type or kind of content threat mitigation or remediation techniques or systems.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A machine learning-based method for detecting fraudulent spam and identifying a fraud threat mitigation response, the method comprising:
    creating a spam corpus that includes spam data samples, wherein each spam data sample of the spam corpus comprises fraudulent text;
    creating a spam embeddings corpus of a plurality of fraudulent sentence embeddings based on converting the spam corpus, wherein creating the spam embeddings corpus includes:
        (a-i) implementing a machine learning-based transformer model that converts each of the spam data samples to a distinct spam numerical vector representation;
        (a-ii) defining a spam vector corpus for a plurality of distinct spam numerical vector representations based on the conversion of the spam data samples;
    defining, using a clustering algorithm, a plurality of distinct spam clusters based on the spam vector corpus, wherein defining the plurality of distinct spam clusters includes:
        (b-i) setting a clustering similarity parameter that informs a clustering density of an unsupervised machine learning-based clustering model, wherein the clustering similarity parameter governs a size of the plurality of distinct spam clusters;
        (b-ii) implementing the unsupervised machine learning-based clustering model that creates the plurality of distinct spam clusters by grouping distinct subsets of the plurality of distinct spam numerical vector representations of the spam vector corpus, wherein each of the plurality of distinct spam clusters includes a distinct centroid;
    creating a searchable index of the plurality of distinct spam clusters;
    implementing a web-based spam threat interface that:
        (c-i) receives input of a target spam data item comprising one or more potentially fraudulent sentences, wherein the target spam data item is converted to a target spam numerical vector value using the machine learning-based transformer model;
        (c-ii) performs a search of the searchable index of the plurality of distinct spam clusters based on the target spam numerical vector, wherein performing the search of the searchable index includes pairing the target spam numerical vector value to one or more distinct spam clusters of the plurality of distinct spam clusters that include one or more distinct spam numerical vector representations associated with character substitutions to the target spam data item; and
    identifying a fraud threat mitigation response including blocking the target spam data item based on results of the search of the searchable index.

2. The method according to claim 1, wherein
performing the search of the searchable index further includes pairing the target spam numerical vector value to one or more distinct spam clusters of the plurality of distinct spam clusters that includes one or more distinct spam numerical vector representations equivalent to the target spam numerical vector value.

3. The method according to claim 1, further comprising
displaying, on the web-based spam threat interface, a spam cluster-to-user network map for one of the one or more distinct spam clusters, wherein the spam cluster-to-user network map includes:
    (a) a textual summary of the one of the one or more distinct spam clusters;
    (b) a plurality of representations of user accounts associated with the one of the one or more distinct spam clusters; and
    (c) a plurality of graphical edges, wherein each graphical edge of the plurality of graphical edges extends in a direction from a distinct representation of a user account of the plurality of representations of user accounts to the textual summary.

4. The method according to claim 3, further comprising
mitigating, via executing one or more digital threat mitigation actions, a plurality of user accounts associated with the plurality of representations of user accounts that prevents the plurality of user accounts from performing at least one type of digital event.

5. The method according to claim 1, wherein
the fraud threat mitigation response further includes implementing an automated decisioning workflow that automatically blocks future content data from publishing on an online resource if the future content data is identical or semantically similar to the target spam data item.

6. The method according to claim 1, wherein
the one or more potentially fraudulent sentences of the target spam data item relates to text data, communication data, or media data that is posted to a web or Internet-accessible medium, platform, service, system, or channel.

7. The method according to claim 1, wherein
defining the plurality of distinct spam clusters further includes (b-iii) attributing to each of the plurality of distinct spam clusters a classification label indicating digital abuse.

8. The method according to claim 7, further includes
in response to performing the search of the searchable index:
identifying one or more distinct spam clusters of the plurality of distinct spam clusters comprising at least one distinct spam numerical vector representation that is equivalent or a near-equivalent to the target spam numerical vector value of the target spam data item; and
displaying, on the web-based spam threat interface, the one or more distinct spam clusters.

9. The method according to claim 1, wherein
the one or more potentially fraudulent sentences of the target spam data item relates to text content observed from an online post.

10. The method according to claim 1, wherein
each distinct spam cluster of the plurality of distinct spam clusters generated by the unsupervised machine learning-based clustering model corresponds to a distinct one of a plurality of distinct type of spam content.

11. The method according to claim 1, wherein
each distinct spam numerical vector representation, computed by the machine learning-based transformer model, is a representation of one of the spam data samples in a numerical form.

12. The method according to claim 1, wherein
setting the clustering similarity parameter includes setting the clustering similarity parameter to a state that permits the unsupervised machine learning-based clustering model, when implemented, to create distinct spam clusters comprising identical spam numerical vector representations and non-identical spam numerical vector representations substantially similar to the identical spam numerical vector representations.

13. A machine learning-based method for detecting fraudulent spam and identifying a fraud threat mitigation response, the method comprising:
implementing an unsupervised machine learning-based clustering model that predicts a plurality of distinct spam clusters based on a plurality of spam numerical vector representations;
creating a searchable index of the plurality of distinct spam clusters, wherein the searchable index includes a searchable representation for each distinct spam cluster of the plurality of distinct spam clusters;
implementing a web-based spam threat interface that:
(i) receives input of a target spam data item comprising one or more potentially fraudulent sentences;
(ii) initiates a search of the searchable index of the plurality of distinct spam clusters based on an embedded representation of the target spam data item;
identifying a fraud threat mitigation response that includes blocking the target spam data item based on results of the search returning at least one distinct spam cluster of the plurality of distinct spam clusters corresponding to digital fraud or digital abuse;
displaying, on the web-based spam threat interface, a spam cluster-to-user network map for the at least one distinct spam cluster corresponding to digital fraud or digital abuse, wherein the spam cluster-to-user network map includes:
(a) a textual summary of the at least one distinct spam cluster; and
(b) a plurality of representations of user accounts associated with the at least one distinct spam cluster; and
mitigating, via executing one or more digital threat mitigation actions, a plurality of user accounts associated with the plurality of representations of user accounts that prevents the plurality of user accounts from performing at least one type of digital event.

14. The method according to claim 13, wherein:
the fraud threat mitigation response further includes implementing an automated decisioning workflow that automatically blocks future content data from being published to an online resource of a target subscriber if the future content data is identical or semantically similar to the target spam data item.

15. The method according to claim 13, wherein
each distinct spam cluster of the plurality of distinct spam clusters created by the unsupervised machine learning-based clustering model corresponds to a specific type of spam content.

16. A machine learning-based method for detecting fraudulent spam and identifying a fraud threat mitigation response, the method comprising:
creating a spam corpus of spam data samples, wherein each spam data sample of the spam corpus comprises one or more fraudulent sentences;
creating a spam embeddings corpus of a plurality of fraudulent sentence embeddings, wherein creating the spam embeddings corpus includes:
(a-i) implementing a machine learning-based transformer model that converts each of the spam data samples to a distinct spam numerical vector representation;
(a-ii) defining a spam vector corpus for a plurality of distinct spam numerical vector representations based on the conversion;
creating a plurality of distinct spam clusters based on the spam vector corpus, wherein creating the plurality of distinct spam clusters includes:
(b-i) setting a clustering similarity parameter for an unsupervised machine learning-based clustering model, wherein the clustering similarity parameter governs a size of the plurality of distinct spam clusters;
(b-ii) implementing the unsupervised machine learning-based clustering model that creates the plurality of distinct spam clusters by grouping distinct subsets of the plurality of distinct spam numerical vector representations of the spam vector corpus;
creating a searchable index of the plurality of distinct spam clusters;

implementing a web-based spam threat interface that:
- (c-i) receives input of a target spam data item comprising one or more potentially fraudulent sentences, wherein the target spam data item is converted to a target spam numerical vector value using the machine learning-based transformer model;
- (c-ii) initiates a search of the searchable index of the plurality of distinct spam clusters based on the target spam numerical vector, wherein the search of the searchable index includes pairing the target spam numerical vector value to one or more distinct spam clusters of the plurality of distinct spam clusters that include one or more distinct spam numerical vector representations associated with character substitutions to the target spam data item; and identifying a fraud threat mitigation response including blocking the target spam data item based on results of the search of the searchable index.

17. The method according to claim 16, wherein:

the fraud threat mitigation response further includes implementing an automated decisioning workflow that automatically blocks future content data from being published to an online resource of a target subscriber if the future content data is identical or semantically similar to the target spam data item.

18. The method according to claim 16, further includes in response to performing the search of the searchable index:

identifying one or more distinct spam clusters of the plurality of distinct spam clusters comprising at least one distinct spam numerical vector representation equivalent or substantially equivalent to the target spam numerical vector value of the target spam data item.

* * * * *